F. W. COLE.
FRANGIBLE PROTECTING DEVICE.
APPLICATION FILED OCT. 27, 1908.
923,115.
Patented May 25, 1909.
2 SHEETS—SHEET 1.
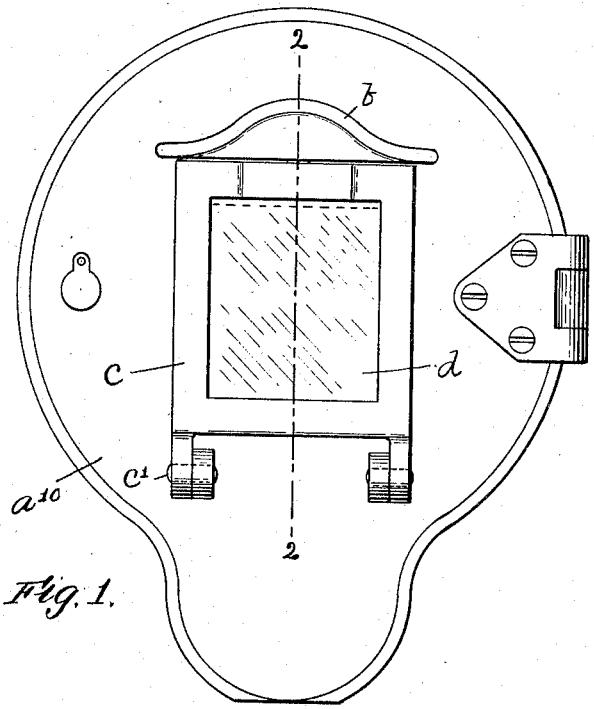
Fig. 1.
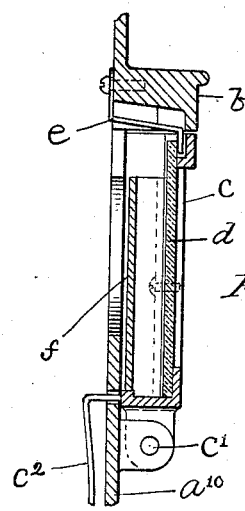
Fig. 2.
Fig. 3.
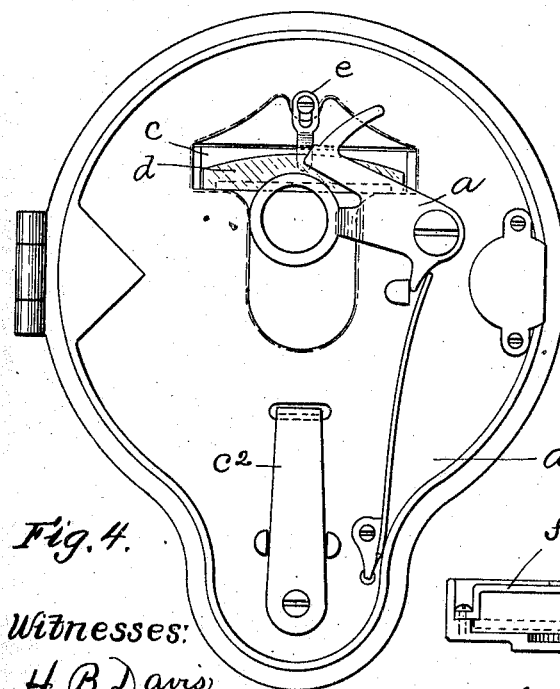
Fig. 4.
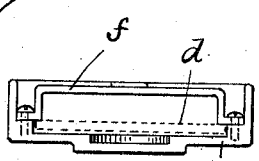
Fig. 5.
Witnesses:
H. B. Davis.
Cynthia Doyle.
Inventor:
Frederick W. Cole
by Hays & Hannivan
attys.

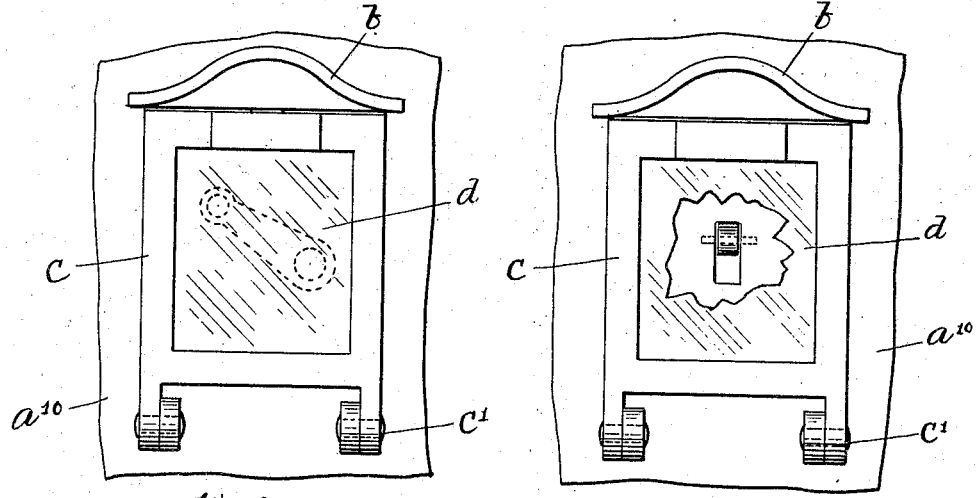
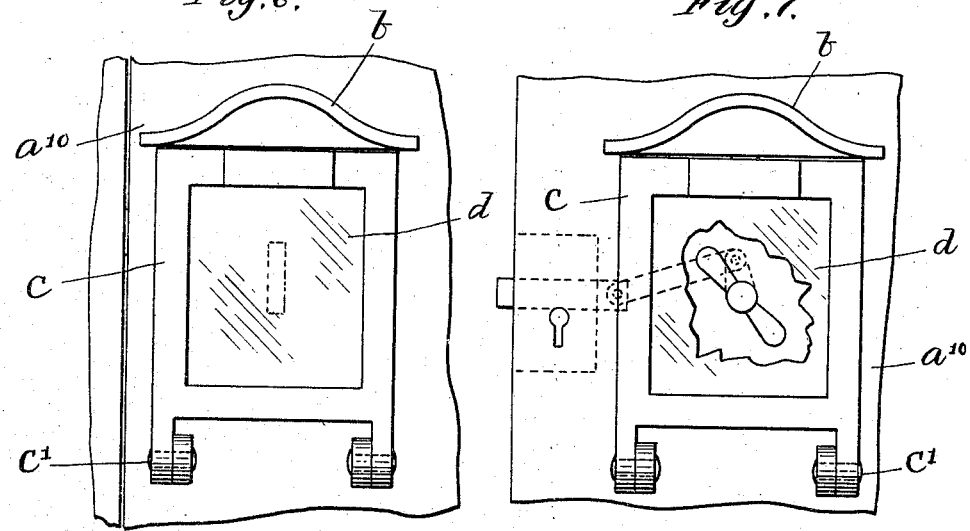
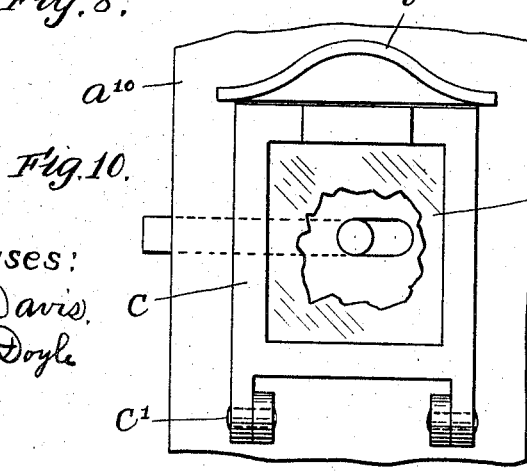

UNITED STATES PATENT OFFICE.

FREDERICK W. COLE, OF NEWTON, MASSACHUSETTS, ASSIGNOR TO THE GAMEWELL FIRE-ALARM TELEGRAPH COMPANY, OF NEW YORK, N. Y., A CORPORATION OF NEW YORK.

FRANGIBLE PROTECTING DEVICE.

No. 923,115.      Specification of Letters Patent.      Patented May 25, 1909.

Application filed October 27, 1908. Serial No. 459,722.

*To all whom it may concern:*

Be it known that I, FREDERICK W. COLE, of Newton, county of Middlesex, State of Massachusetts, have invented an Improvement in Frangible Protecting Devices, of which the following is a specification.

This invention relates to frangible protecting devices or guards for the actuating-levers of fire-alarm boxes and for other things and is intended as an improvement upon the guard shown in my patent #824411, dated June 26, 1906.

The invention has for its object to provide a guard consisting of a self-opening door or pivoted frame or other form of cover having a glass plate or other frangible element, with a shield, located back of said glass plate. Also to make said shield of a size to substantially cover the opening which the guard is designed to protect to prevent the pieces of broken glass from passing through said opening. Also to dispose said shield remotely back of the glass plate to provide a space therebetween. Also to provide the cover bearing the glass plate with a pocket back of said glass plate, which is adapted to receive the broken pieces of glass. Also to provide the cover having a pocket with an opening at the top, so that when the cover is inverted any broken pieces of glass which may be contained in said pocket will be discharged. Also to provide means inside the box, which is accessible when the box door is open, for engaging the glass plate to hold the self-opening door or pivoted frame or other form of cover in closed position.

Figure 1 is a front view of a guard embodying this invention, it being represented as applied to a fire-alarm box to cover a front opening therein by which access may be had to the actuating-lever. Fig. 2 is a vertical section of the same taken on the line 2—2 Fig. 1; the guard being in closed position. Fig. 3 is a vertical section of the same, the guard being in open position. Fig. 4 is a rear side view of the box door, showing the guard thereon and the actuating-lever. Fig. 5 is a top view of the guard. Figs. 6, 7, 8, 9 and 10 are views showing different things protected by the cover.

The guard herein shown consists of a door or pivoted frame or other form of cover $c$ of suitable shape and size to cover the actuating-handle or pull of a fire-alarm box, or to entirely cover an opening in the box door $a^{10}$ or any other part of a box or other object by which access may be had to the actuating-lever $a$ or other thing arranged back of said opening. The shape and size of the cover will depend upon the thing which is to be covered or protected, and as my invention is applicable to general uses it is not limited to any particular shape or size of cover. As herein shown the cover is hinged to the box or other object at its lower end as at $c'$ and when closed occupies an upright position. Ordinarily the weight of the cover will be sufficient to open it, but herein a flat spring $c^2$ is secured to the inside of the box door, the end of which engages the base of the cover and acts to open it when permitted to act. In lieu of a spring any other suitable means may be employed for accomplishing this result. My invention, however, is not limited to a self-opening or automatically opened cover, as many of the features of my invention are applicable whether it is made self-opening or not. Nor do I desire to limit my invention to pivoting it at its lower end, as it may be otherwise movably supported, so as to be swung outward or pushed open.

The cover is herein shown as a quadrangular frame having a base, upright side portions and a top, such being the form I prefer to employ. This frame has a front opening adapted to be closed by a glass plate $d$ or other kind of frangible plate which is designed to be broken for the purpose of releasing the cover. The frame has interior guides on its upright side portions for the side edges of the glass plate and is open at the top so that new plates may be inserted easily. The lower edge of the glass plate rests on the base of the frame. The upper end of the frame has a recess opposite the upper edge of the glass plate to receive the end of the clip $e$, which is attached to the inner side of the box door and which is accessible only when the box door is open. This clip is preferably slotted and is attached by means of a screw passing through said slot, so that it may be adjusted as well as easily fastened or loosened whenever required. The cover $c$ is formed or provided with a shield $f$ back of its front opening, and hence back of the glass plate which is set therein. Said shield is made as a flat plate with forwardly extended sides and is secured to the frame by screws or otherwise. It is remotely disposed with respect to the glass plate, so as to provide a space between to form a pocket to receive the broken pieces of glass. It extends from the bottom of the cover nearly to the top and hence is made large enough to substantially cover the opening or other thing which is to be protected, and thereby prevent the pieces of broken glass from passing therethrough or being left in juxtaposition to the thing which is being protected. It terminates below the upper end of the cover. The opening at the upper end of the cover is made large enough to provide for the discharge of the broken pieces of glass, as shown in Fig. 5. The shield herein shown can easily be made quite large and hence a large opening may be provided in the box, or door thereof, so that when exposed access may be easily had to the actuating-lever or other thing which is arranged back of said opening.

In operation the glass plate is set in the cover and the cover is closed and secured in closed position by the clip $e$. On breaking the glass plate the broken pieces will fall in front of the shield $f$, in the pocket provided for them, and the cover will be released and will fall by gravity or otherwise, and uncover the opening or other thing which is being protected. Above the door $c$ a projection or ledge $b$ is usually provided, which, when the door is closed, extends over the upper end of the cover and closes the opening at the top thereof, and said projection is recessed to provide for the locking clip $e$. In Fig. 6, the cover is arranged over the winding-arm or actuating-lever of a signal-transmitter, which is disposed on the outside of the box door; in Fig. 7 it is arranged over a pull of ordinary construction; and in Fig. 8 it is arranged over a key for the lock of the door; in Figs. 9 and 10 the cover is arranged over a knob for a door catch. These illustrations represent merely a few of the general uses to which the invention may be put.

Having thus described my invention, what I claim as new and desire to secure by Letters Patent is:—

1. A guard consisting of a self-opening cover having a glass plate and a shield back of said plate, and means engaging said plate for holding the cover closed, substantially as described.

2. A guard consisting of a self-opening cover having a glass plate and a shield remotely disposed back of said plate to provide a space therebetween, and means, engaging said plate, for holding the cover closed, substantially as described.

3. A guard consisting of a pivoted frame having an opening closed by a glass-plate and having a shield back of said opening, and means, engaging the glass plate, for holding the frame in closed position, substantially as described.

4. A guard consisting of a pivoted frame having a front opening closed by a glass plate and a shield back of said front opening which is connected with the frame, and means, engaging the glass plate, for holding the frame in closed position, substantially as described.

5. A guard consisting of a pivoted frame having a front opening closed by a glass plate and having a shield remotely disposed back of said front opening to provide a space therebetween and above the bottom of the frame to form a pocket to receive the broken pieces of glass, and means engaging the glass plate to hold the frame in closed position, substantially as described.

6. A box having an opening and a guard covering said opening consisting of a self-opening cover having a glass plate, and means, accessible only at the inside of the box, engaging said plate for holding said cover closed, substantially as described.

7. A box having an opening and a guard covering said opening consisting of a pivoted frame having an opening closed by a glass plate, and means, accessible at the inside of the box, engaging said plate for holding the frame in closed position, substantially as described.

8. A box having an opening, a guard covering said opening consisting of a pivoted frame bearing a glass plate, and a clip attached to the inside of the box, engaging said plate for holding the frame in closed position, substantially as described.

9. A box door having an opening through it by which access may be had to an actuating-lever or other thing, a guard covering said opening consisting of a pivoted frame having an opening closed by a glass plate, and means mounted on the inside of the box door and accessible when the door is open, engaging said plate for holding the frame in closed position, substantially as described.

10. A box door having an opening through it by which access may be had to an actuating-lever or other thing, a guard covering said opening consisting of a self-opening cover having a glass plate, and means, mounted on the inside of the box door and accessible when said box door is open, engaging said plate for holding said self-opening cover closed, substantially as described.

11. A box having an opening, a guard placed over said opening consisting of a self-opening cover having a glass plate, and a shield back of said plate which substantially covers said opening, and means, engaging said plate, for holding the cover closed, substantially as described.

12. A box having an opening, a guard placed over said opening consisting of a pivoted frame having a front opening closed by a glass plate and a shield back of said front opening which substantially covers said opening in the box, and means engaging said plate for holding the frame in closed position, substantially as described.

13. A guard consisting of a pivoted frame having a glass plate and having a pocket back of said plate to receive the broken pieces of glass, said pocket being open at the top to permit the discharge of the broken pieces when the frame is inverted, and means, engaging the glass plate, for holding the frame in closed position, substantially as described.

14. A box having an opening and having a projection above said opening, and a guard arranged on the box over said opening having a front opening closed by a glass plate and a shield back of said opening to form a pocket having an opening at the top, said guard being pivotally connected with the box and when closed occupying a position with its upper open end beneath said projection, substantially as described.

In testimony whereof, I have signed my name to this specification, in the presence of two subscribing witnesses.

FREDERICK W. COLE.

Witnesses:
B. J. NOYES,
H. B. DAVIS.